United States Patent

Nakajima et al.

[11] Patent Number: 5,922,300
[45] Date of Patent: Jul. 13, 1999

[54] PROCESS FOR PRODUCING SILICON CARBIDE FIBERS

[75] Inventors: Keihachiro Nakajima, Yokohama; Hitoshi Kato, Nakano-ku; Kaoru Okada, Kashiwa; Ryoji Kubo, Shinjuku-ku, all of Japan

[73] Assignee: OJI Paper Co., Ltd., Tokyo, Japan

[21] Appl. No.: 09/010,126

[22] Filed: Jan. 21, 1998

[30] Foreign Application Priority Data

Jan. 23, 1997 [JP] Japan .................................. 9-010457

[51] Int. Cl.⁶ .................................................. C01B 31/36
[52] U.S. Cl. ............................ 423/346; 423/345; 501/95
[58] Field of Search ................................. 423/345, 346; 501/95

[56] References Cited

U.S. PATENT DOCUMENTS

| 875,673 | 12/1907 | Potter | 423/345 |
| 2,431,326 | 11/1947 | Heyroth | 423/345 |
| 3,927,181 | 12/1975 | Niimi et al. | 423/345 |
| 4,368,181 | 1/1983 | Suzuki et al. | 423/345 |
| 4,873,069 | 10/1989 | Weaver et al. | 423/345 |
| 4,915,924 | 4/1990 | Nadkarni et al. | 423/345 |
| 5,618,510 | 4/1997 | Okada et al. | 423/345 |
| 5,676,918 | 10/1997 | Okada et al. | 423/345 |

FOREIGN PATENT DOCUMENTS

| 0032097 | 7/1981 | European Pat. Off. | 423/345 |
| 0 310 265 | 4/1989 | European Pat. Off. | 423/345 |
| 603 888 A2 | 6/1994 | European Pat. Off. | |
| 2 068 161 | 8/1971 | France | 423/345 |
| 51-137694 | 11/1976 | Japan . | |
| 61-256910 | 11/1986 | Japan | 423/345 |
| 62-265200 | 11/1987 | Japan | 423/345 |
| 1-111800 | 4/1989 | Japan . | |
| 2-255516 | 10/1990 | Japan . | |
| 4-149016 | 5/1992 | Japan | 423/345 |
| 6-192917 | 7/1994 | Japan . | |
| 6-306710 | 11/1994 | Japan . | |
| 7-97281 | 4/1995 | Japan . | |
| WO 94/27928 | 12/1994 | WIPO . | |

*Primary Examiner*—Ngoc-Yen Nguyen
*Attorney, Agent, or Firm*—Nikaido Marmelstein Murray & Oram, LLP

[57] ABSTRACT

A process for producing silicon carbide fibers is provided, comprising the steps of mixing a silicon supply source powder including a mixture of silicon powder and silicon dioxide powder having a molar mixing ratio of 1:0.1 to 1:2 with activated carbon staple fibers having a length of 0.1 to 50 mm and a fiber thickness of 1 to 20 $\mu$m and a specific surface area of 300 to 2000 $m^2/g$ determined by the BET nitrogen absorption method; and heating the resultant mixture at a temperature of 1200 to 1500° C. to directly convert the activated carbon staple fibers, in an atmosphere substantially free from substances reactive with carbon, silicon, silicon oxides and silicon carbide at the above mentioned temperature, to silicon carbide fibers.

21 Claims, 1 Drawing Sheet

PROCESS FOR PRODUCING SILICON CARBIDE FIBERS

BACKGROUND OF THE INVENTION

1. Field of the Invention

The present invention relates to a process for producing silicon carbide fibers. More particularly, the present invention relates to a process for producing silicon carbide fibers directly from a carbon-supply source consisting of activated carbon fibers and a silicon-supply source consisting of a powder of at least one member selected from elemental silicon and silicon oxides.

2. Description of the Related Art

A simple process for producing silicon carbide fibers having a high mechanical strength by reacting porous carbon fibers with a gaseous silicon monoxide (SiO) at a temperature of 800 to 2000° C. is disclosed in Japanese Unexamined Patent Publication No. 6-192,917.

Also, Japanese Unexamined Patent Publication No. 7-97,281 discloses a process for producing silicon carbide material in the form of a sheet or a three-dimensionally constructed article, by reacting a mass of porous carbon fibers in the form of a sheet or a three-dimensionally constructed article, for example, an article having a honeycomb structure, with gaseous silicon monoxide (SiO) at a temperature of 800 to 2000° C.

By the above-mentioned processes, the silicon carbide fibers or a shaped article consisting thereof, having a high heat resistance and an excellent mechanical strength can be easily produced. However, these processes are disadvantageous in that when a high efficiency of the siliconizing reaction is required, the reaction must be carried out under a reduced pressure and thus the reaction equipment must be complicated, and the reaction for producing the silicon carbide fibers is difficult to carry out at high efficiency.

Japanese Unexamined Patent Publication No. 1-111,800 discloses a process for producing silicon carbide whiskers. In this process, a first reaction region is formed from carbon or a carbon precursor and fine particulate silicon dioxide particles uniformly mixed with each other at a mixing weight ratio of about 5:1 or more, a second reaction region is formed closely adjacent to the first reaction region from porous and fibrous non-fusible carbon precursor or activated carbon having a porosity of 70% by volume or more and a length of 200 $\mu$m or more, the first and second reaction regions are heated to a desired reaction temperature of 1200 to 1700° C. in a non-oxidative atmosphere, thereby to produce silicon monoxide in the first reaction region, to immediately cause the silicon monoxide to diffuse into the second reaction region and react with the above-mentioned activated carbon or carbon contained in the carbon precursor in the second reaction region to produce silicon carbide. In this process, during the production of silicon carbide, separately, a whisker-production catalyst which is continuously applicable, is supplied in and around the second reaction region in which at least the silicon monoxide and carbon react with each other.

This process can produce silicon carbide whiskers. In this process a silicon monoxide gas is produced from a mixture of extremely fine silicon dioxide particles and carbon in a reaction region, introduced into another reactive region filled with activated carbon in a porous filling condition and containing a whisker producing catalyst and passed through the other reactive region so as to react with the activated carbon or the carbon derived from the carbon precursor in the presence of the catalyst, for example, an iron compound, and to produce the silicon carbide whiskers on the carbon surface.

The whiskers are a crystalline material consisting of silicon carbide (SiC) and are in the form of fine fibers having a diameter of 0.5 to 1 $\mu$m and an aspect ratio of 20 to 100. Therefore, the whiskers have a very high tensile strength, modulus of elasticity and ultimate elongation. However, as a practical reinforcing material, the silicon carbide whiskers are not always useful in comparison with the silicon carbide fibers produced by reacting the activated carbon fibers with a silicon monoxide gas. The term "aspect ratio" used herein is a ratio of a length to a diameter of a fiber.

Namely, when carbon is heated in the presence of a silicon carbide gas, and resultant carbon compounds generated from the carbon, such as carbon monoxide (CO), carbon dioxide ($CO_2$) and methane ($CH_4$), react with the silicon monoxide, the resultant silicon carbide is deposited on the carbon surfaces and grows in the form of whiskers from the carbon surfaces. Therefore, the silicon carbide whiskers are quite different from the above-mentioned silicon carbide fibers directly converted from the activated carbon fibers per se by a reaction of the activated carbon fibers with silicon monoxide.

In the mentioned process for producing silicon carbide fibers by the reaction of the activated carbon fibers with a silicon monoxide, the silicon supply source material and the activated porous carbon fibers are placed separately from each other in a reaction furnace, and heated to generate the silicon monoxide gas, and the silicon monoxide gas is brought into contact and reacted with the activated carbon fibers, to convert the activated carbon fibers directly to silicon carbide fibers. This conventional process is disadvantageous in that (1) since the reaction of the porous activated carbon fibers with the silicon monoxide gas progresses with penetration of the silicon monoxide gas into the inside of the porous activated carbon fibers, the efficiency of the reaction can be enhanced only by making the specific surface area of the porous activated carbon fibers as large as possible;

(2) even if the specific surface area of the porous activated carbon fibers is sufficiently large, when the reaction is carried out at a high temperature of 1000° C. or more, the fine pores distributed in the activated carbon fibers are crushed so as to decrease the specific surface area of the porous fibers, and thus the reaction efficiency is decreased;

(3) if the reaction atmosphere is not established under a reduced pressure, a concentration of the silicon monoxide necessary to effect the reaction is difficult to obtain, and thus the reaction efficiency becomes very low; and (4) due to the low reaction efficiency, when the porous activated carbon fibers to be subjected to the reaction with the silicon monoxide gas are in the form of a bulky sheet or other three-dimensional shaped article, the silicon carbide-producing reaction cannot be uniformly carried out, and thus the resultant silicon carbide fibers contain non-reacted carbon portions.

Accordingly, it has been strongly demanded to provide a new process for producing silicon carbide fibers or shaped articles thereof having high mechanical strength and heat resistance from activated carbon fibers or shaped articles thereof and a silicon-supply source material under the ambient atmospheric pressure and at a relatively low temperature with a high reaction efficiency.

SUMMARY OF THE INVENTION

An object of the present invention is to provide a process for producing silicon carbide fibers or a shaped article thereof having high mechanical strength and heat resistance directly from activated carbon fibers by reacting them with a silicon supply source material under ambient atmospheric pressure and at a relatively low temperature, with a high efficiency.

The above-mentioned object can be attained by the process of the present invention for producing silicon carbide fibers, which comprises the steps of:

mixing a silicon-supply source powder comprising at least one member selected from silicon and silicon oxides with activated carbon fibers having a fiber thickness of 1 to 20 μm and a specific surface area of 300 to 2000 $m^2/g$ determined by the BET nitrogen absorption method; and heating the resultant mixture at a temperature of 1200 to 1500° C. in an atmosphere substantially free from substances reactive with carbon, silicon, silicon oxides and silicon carbide at the above-mentioned temperature to directly convert the activated carbon fibers to silicon carbide fibers.

In the process of the present invention, the atmosphere for the heating step preferably has total of the partial pressures of oxygen and nitrogen restricted to $10^3$ Pa or less.

In the process of the present invention, the heating step may be carried out in a flow of an inert gas passing through the mixture or under a reduced pressure of $10^3$ Pa or less.

In the process of the present invention, the activated carbon fibers are preferably in the form of staple fibers having a fiber length of 0.1 to 50 mm.

Also, after the heating step is completed, the residual non-reacted silicon-supply source powder is preferably separated and removed from the resultant silicon carbide fibers.

In the process of the present invention, the activated carbon fibers may be in the form of a shaped article, for example, a sheet or a three-dimensionally shaped article.

In the process of the present invention, the silicon-supply source powder preferably comprises a mixture of a silicon powder with a silicon dioxide powder.

In the process of the present invention, after the heating step is completed, preferably the removal of the residual non-reacted silicon-supply source powder is carried out by at least one washing procedure with a washing solution selected from aqueous solutions of alkali metal hydroxides and an aqueous solution of hydrofluoric acid.

DESCRIPTION OF THE PREFERRED EMBODIMENTS

Figure 1:
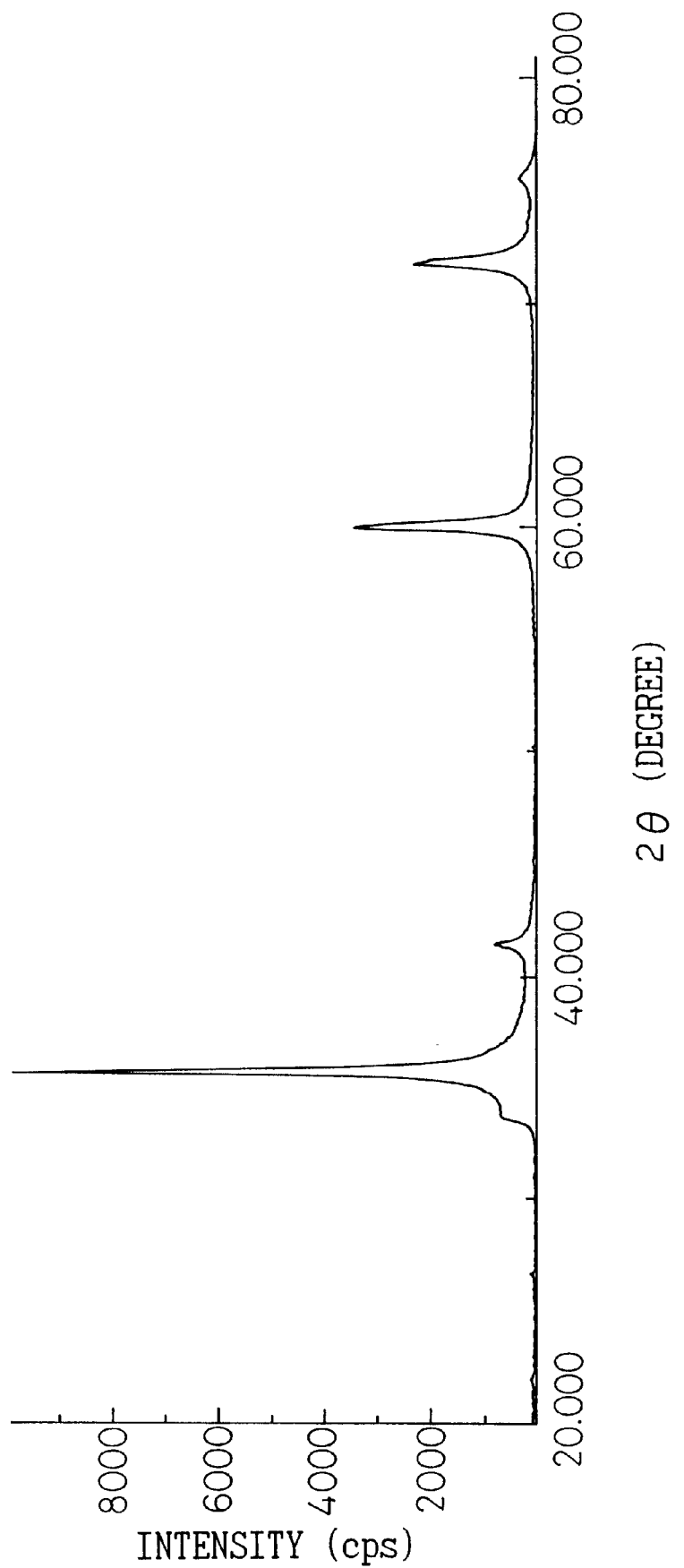
FIG. 1 is an X-ray diffraction chart of the silicon carbide fibers produced by the process of the present invention.

The inventors of the present invention have extensively studied various methods for producing silicon carbide fibers having a high mechanical strength and an excellent heat resistance. As a result, the inventors have found that by the process in which the activated carbon fibers are mixed with a silicon-supply source powder comprising at least one member selected from silicon and silicon oxides, the resultant mixture is heated in a specific relatively low temperature range in an atmosphere containing substantially no substance reactive with carbon, silicon, silicon oxides and silicon carbide, to thereby generate on-site a silicon and/or silicon oxide-containing gas from the silicon-supply source powder distributed adjacent to the activated carbon fibers, and to immediately react the generated gas with the activated carbon fibers, the target silicon carbide fibers, having a lighter weight, can be produced with a higher efficiency than those in the conventional process in which a silicon and/or silicon oxide-containing gas is previously generated and brought into contact with the activated carbon fibers to react with each other.

The present invention was completed based on the above-mentioned finding.

In the process of the present invention, activated porous carbon fibers are mixed with a silicon-supply source powder comprising at least one member selected from silicon and silicon oxides, and the resultant mixture is heated at a temperature of 1200 to 1500° C. in an atmosphere substantially free from substances reactive with carbon, silicon, silicon oxides and silicon carbide at the above-mentioned temperature, to thereby generate a gas containing silicon and/or silicon oxides from the silicon-supply source particles located in contact with or adjacent to the surfaces of the activated carbon fibers, and to allow the resultant silicon and/or silicon oxide-containing gas to immediately penetrate into the inside of the activated carbon fibers and react therewith.

The activated carbon fibers usable for the process of the present invention have a fiber thickness (diameter) of 1 to 20 μm, preferably 5 to 15, and a specific surface area of 300 to 2000 $m^2/g$, preferably 500 to 1500 $m^2/g$, determined by the BET nitrogen absorption method.

When the fiber thickness of the activated carbon fibers is less than 1 μm, the resultant activated carbon fibers are difficult to handle. Also, if the fiber thickness is more than 20 μm, the resultant activated carbon fibers are difficult to uniformly react with the silicon and/or silicon oxide-containing gas, and thus the resultant silicon carbide fibers are uneven in the quality thereof.

When the specific surface area of the activated carbon fibers is less than 300 $m^2/g$, the reaction of the resultant activated carbon fibers with the silicon and/or silicon oxide-containing gas generated from the silicon-supply source powder is difficult to carry out uniformly at a sufficiently high reaction rate, thus non-reacted carbon remains in the resultant silicon carbide fibers, and the resultant silicon carbide fibers cannot exhibit satisfactory performance. When the specific surface area is more than 2000 $m^2/g$, the resultant activated carbon fibers are produced at a low yield, and thus are disadvantageous from economical point of view, and the resultant silicon carbide fibers exhibit an unsatisfactory mechanical strength.

Preferably, the activated carbon fibers are in the form of staple fibers having a fiber length of 0.1 to 50 mm, more preferably 1 to 30 mm, or in the form of continuous filaments.

When the activated carbon fibers are in the form of staple fibers having a length less than 0.1 mm, it may be difficult to separate the resultant silicon carbide fibers from the residual non-reacted silicon-supply source powder after the heating step. Also, when the fiber length is more than 50 mm, the resultant activated carbon staple fibers may be difficult to uniformly mix with the silicon-supply source powder.

Also, when the staple fiber length is less than 0.1 mm or more than 50 mm, the resultant activated carbon staple fibers may be difficult to uniformly form a sheet or web by a dry or wet method, and the resultant sheet or web may have an unsatisfactory sheet structure and appearance.

The activated carbon staple fibers may be in the form of a spun yarn, and the activated carbon filaments may be in the form of a monofilament, a multifilament, or a mono- or multi-filament yarn.

Also, the activated carbon fibers (filaments) may be in the form of a sheet, namely a woven fabric, a knitted fabric, a nonwoven fabric, a felt or a composite sheet of two or more of the above-mentioned fabrics and felt, or of a three-dimensionally shaped article, for example, honeycomb-shaped article, pipe or three-dimensional woven or knitted fabric.

The activated carbon fibers usable for the process of the present invention and having the above-mentioned thickness and specific surface area can be produced by conventional methods.

For example, a method in which precursor fibers comprising an organic substance are carbonized and activated is disclosed, for example, in Japanese Examined Patent Publication No. 58-20,883. In this method, acrylonitrile polymer fibers are subjected to an oxidation treatment in an oxidative atmosphere at a temperature of 200 to 300° C. until a bonded oxygen content of the resultant oxidation-treated fibers reaches 80% or more of the saturated bonded oxygen content thereof, while applying a tension, sufficient to cause the oxidation-treated fibers to shrink at a shrinkage of 50 to 90% of the free shrinkage thereof, to the fibers, and then the resultant fibers are activated in a water vapor atmosphere, to produce activated carbon fibers. This method can be utilized to produce the activated carbon fibers for the process of the present invention.

Japanese Unexamined Patent Publication No. 6-306,710 discloses activated carbon fibers produced from pitch supplied from fossil fuel. The activated carbon fibers can be produced by forming carbon fibers from an aromatic heavy oil or pitch having an aromatic carbon ratio of 0.6 or more, a molecular weight of 200 to 450 and a softening temperature of 200° C. or less by a melt-spinning method; nitrating, in liquid phase, the resultant fibers with a nitrating reagent in the presence of an acid catalyst; making the nitrated fibers infusible, and activating the resultant infusible fibers. Especially, to provide activated carbon staple fibers, precursor staple fibers are formed by spinning at a desired length or cutting in a desired length and the staple fibers are carbonized and activated, or precursor continuous filaments are carbonized and activated and then cut to a desired length.

The activated carbon fibers can be formed into a sheet-shaped article, for example, a nonwoven fabric or web produced by a conventional method as disclosed in, for example, Japanese Unexamined Patent Publication No. 2-255,516. This method can continuously produce an activated pitch carbon fiber web by the steps of producing continuous filaments from pitch by a melt-spinning procedure; collecting and accumulating the continuous pitch filaments to form a web; making the pitch filament web infusible; and activating the infusible filament web.

Also, the activated carbon fiber web or felt usable for the process of the present invention can be produced by shaping carbon fiber-forming precursor fibers or carbon fibers into a web or felt by a dry or wet method, and converting the web or felt to an activated carbon fiber web or felt; or by shaping activated carbon staple fibers into a web or felt. Also, the carbon fiber-forming precursor fibers or carbon fibers in the form of continuous filament yarns or staple fiber-spun yarns are converted to a carbon fiber woven or knitted fabric, and then the carbon fiber fabric is activated. Alternatively activated carbon filament yarns or activated carbon staple fiber-spun yarns are converted into a woven or knitted fabric.

The three dimensionally shaped article comprising the activated carbon fibers can be produced by shaping an activated carbon fiber sheet (web, fabric or felt) into a corrugated sheet, a pipe or cylinder, a roll, or a honeycomb-shaped article.

The silicon-supply source powder containing at least one member selected from silicon and silicon oxides includes a mixed powder of silicon (Si) and silicon dioxide ($SiO_2$), a solid silicon monoxide (SiO) powder, a solid silicon (Si) powder, a mixed powder of carbon (C) and silicon dioxide ($SiO_2$). Among them, the mixed powder of silicon (Si) with solid silicon monoxide (SiO) and the mixed powder of silicon with silicon dioxide are preferably employed for the process of the present invention, because they are easily available and relatively cheap. The solid silicon monoxide is available as a material for vapor deposition, for example, from Sumitomo Sticks K.K.

When the silicon-supply source powder containing at least one member selected from silicon and silicon oxides is mixed with the activated carbon fibers, and the mixture is heated at a temperature of 1200 to 1500° C., a gas comprising at least one member of silicon and silicon oxides is generated and it reacts with the activated carbon fibers to convert on-site the activated carbon fibers to silicon carbide fibers.

As a silicon-supply source powder, a mixture of a silicon powder and a silicon dioxide powder is employed, and a gas comprising silicon and silicon oxides (SiOx) is generated with a high efficiency. In this case, a molar mixing ratio of silicon to silicon dioxide is preferably 1:0.1 to 1:2, more preferably 1:0.5 to 1:1.5. When the molar mixing ratio of silicon to silicon dioxide is more than 1:0.1, the activating effect of the silicon dioxide on the silicon may be insufficient. Also, when the molar mixing ratio is less than 1:2, the above-mentioned activating effect may be saturated and an economical disadvantage may occur.

When the activated carbon fibers are in the form of staple fibers having a fiber length of 0.1 to 50 mm, the silicon-supply source powder for generating the silicon-containing reactive gas preferably contains a fraction (A) consisting of particles having a particle size of 149 $\mu$m or less and thus capable of passing through a 100 mesh size sieve in an amount of 90% by weight or more based on the total weight of the silicon-supply source powder, and a fraction (B) consisting of the particles having a particle size of 44 $\mu$m or less and thus capable of passing through a 324 mesh size sieve in an amount of 60% by weight or less based on the total weight of the silicon-supply source powder.

When the amount of the fraction (A) having a particle size of 149 $\mu$m or less is less than 90% by weight, and in the case where the silicon-supply source powder comprises, for example, a mixture of silicon particles and silicon dioxide particle, the frequency of contact of the silicon and silicon dioxide particles with each other may be decreased and thus, in the heating step, the reaction for generating the silicon and silicon oxide-containing gas may be reduced. Also, the decrease in the content of the fraction (A) may cause the separation of the resultant silicon carbide staple fibers from the residual non-reacted silicon-supply source powder to be difficult.

Also, when the fraction (B) having a particle size of 44 $\mu$m or less is present in an amount more than 60% by weight, the generation of the silicon and/or silicon oxide-containing gas in the heating step may cause the particles to be agglomerated into grains or lumps, and thus cause the resultant silicon carbide staple fibers to be difficult to separate from the residual non-reacted silicon-supply source powder after the heating step.

When the activated carbon fibers are employed in the form of a sheet, for example, a felt, the fraction (B) of the silicon-supply source powder having a particle size of 44 $\mu$m or less and capable of passing through a 325 mesh size sieve is preferably present in an amount of 90% by weight or more based on the total weight of the silicon-supply source powder. When the amount of the fraction (B) is present in an amount less than 90% by weight, the particles of the silicon-supply source powder may not be uniformly and fully contacted with the activated carbon fibers in the sheet, for example, the felt, and thus the activated carbon fibers may not be uniformly and fully converted to the silicon carbide fibers.

When the silicon carbide fibers are produced in the form of a sheet or a three-dimensionally shaped article, the silicon-supply source powder for generating a silicon and/or silicon oxide-containing gas preferably contains a solid silicon monoxide powder pulverized to such an extent that the content of a fraction consisting of particles having a particle size of 149 $\mu$m or less and capable of passing through a 100 mesh size sieve is 90% by weight or more, and the content of a fraction consisting of particles having a particle size of 44 $\mu$m or less and capable of passing through a 325 mesh size sieve is 60% by weight or less, based on the total weight of the solid silicon monoxide powder.

The silicon-supply source powder is preferably employed in an amount of 1.2 to 20 times, preferably 1.5 to 10 times, the dry weight of the activated carbon fibers. When the amount of the silicon-supply source powder is less than 1.2 times the dry weight of the activated carbon fibers, the degree of conversion of the activated carbon fibers to the silicon carbide fibers may be insufficient, and thus the properties of the resultant silicon carbide fibers may be unsatisfactory. Also, when the amount of the silicon-supply source powder is more than 20 times the weight of the activated carbon fibers, a large excessive amount of the silicon-supply source powder may not contribute to the silicon carbide-production reaction and an economical disadvantage may occur.

In the first step of the process of the present invention, the activated carbon fibers are mixed with an inorganic silicon-supply source powder from which a silicon and/or silicon oxide-containing gas is generated upon heating. The mixing procedure can be carried out by utilizing a conventional mixing device, for example, a mixing agitator, for example, a kenmix mixer (made by Aikosha K.K.), a drum mixer (for example, that made by Kayaba Kogyo K.K.), a ribbon mixer (for example, that made by Tokuju Kosakusho K.K.), when the activated carbon fibers are in the form of staple fibers.

In the mixing procedure, it is important not only that the mixing is effected uniformly, but also that the activated carbon fibers are protected from breakage by an excessive mechanical force applied thereto. The uniformity of the mixing procedure can be enhanced by adding a mixing liquid medium or binder to the mixture.

The mixing liquid medium is preferably selected from conventional volatile solvents which are commonly used in the industry, for example, water, aliphatic alcohols, for example, methyl alcohol and ethyl alcohol, aliphatic ketones, for example, acetone; and aromatic hydrocarbons, for example, toluene. Usually, water is preferably used as a mixing liquid medium for the process of the present invention.

The mixing liquid medium is used in an amount of 0.1 to 2 kg per kg of the activated carbon fibers. When the amount of the mixing liquid medium is less than 0.1 kg/kg the silicon-supply source powder may not be fully cohered to the activated carbon fibers. Also, when the amount of mixing liquid medium is more than 2 kg/kg, the silicon-supply source powder in the mixing liquid medium may be in a greatly decreased concentration, and thus the amount of the silicon-supply source powder cohered to the activated carbon fibers may be too small.

The binder usable for the mixed fibers and particles preferably comprises a member selected from polyvinyl alcohols, acrylic resins, for example, methyl methacrylate homopolymer and copolymers, cellulose derivatives, for example, methyl cellulose, polyvinyl butyral, starch and starch derivatives, for example, carboxymethylated starch, pulp and microfibril cellulose, which are usually usable for shaping a ceramic powder. Usually, the polyvinyl alcohols are preferably used for this purpose.

When polyvinyl alcohol is used as a binder for the mixing procedure, the polyvinly alcohol is preferably employed in the state of an aqueous solution with a concentration of 0.1 to 5% by weight.

The binder for the mixed fibers and particles is preferably used in an amount of 0.01 to 0.10 kg per kg of the activated carbon fibers. When the amount of the binder for the mixed fibers and particles is less than 0.01 kg/kg, the fibers and particles in the resultant mixture may exhibit an unsatisfactory bonding strength to each other. Also, when the amount of the binder is more than 0.10 kg/kg, the grains or lumps of the resultant mixture may exhibit too high a hardness and the silicon carbide-producing reaction may be obstructed.

The binder for the mixed fibers and particles preferably has such properties that the binder can firmly fix the particles of the silicon-supply source powder to the activated carbon fibers, can be easily decomposed during the heating procedure, and can leave substantially no ash on the activated carbon fibers after the heating procedure.

When the activated carbon fibers are mixed with the silicon-supply source powder together with the mixing liquid media and/or the binder, the resultant mixture can be easily shaped into grains or lumps having a size of 2 to 50 mm and dried into solid grains or lumps which can be easily handled.

In another method for mixing the activated carbon fibers with the silicon-supply source powder, the activated carbon fibers and the silicon-supply source powder are dispersed in a large amount of water by stirring, the resultant slurry is subjected to a liquid-removing procedure, and the resultant wet mixture is dried. In these procedures, a binder is optionally added to the slurry. The binder contributes to maintaining the resultant mixture of the activated carbon fibers with the silicon-supply source powder in a uniformly mixed state even after the liquid-removirng and drying procedures and to enhancing the handling property of the mixture. Also, the binder enables the mixture of the activated carbon fibers and the silicon-supply source powder to be formed into a shape suitable to pack the mixture in the heating furnace, during the liquid-removing and drying procedures.

In the process of the present invention, the activated carbon fibers are in the form of a shaped article, for example, a sheet such as a web or felt, pipe or honeycomb-formed article, the silicon-supply source powder can be uniformly mixed with the shaped activated carbon fiber article by the following procedures.

The silicon-supply source powder is dispersed in a dispersing medium, and the resultant dispersion is impregnated in the shaped activated carbon fiber article. By these procedures, the particles of the silicon-supply source powder can be distributed more evenly in the shaped activated carbon fiber article rather than when the silicon-supply source powder is sprinkled over the shaped activated carbon fiber article. The dispersing medium preferably comprises at least one volatile liquid material selected from alcohols such as methyl alcohol, ethyl alcohol and isopropyl alcohol; hydrocarbons, for example, toluene and benzene; ketones such as acetone and methylethylketone; ethers such as tetrahydrofurane and dimethylether; water, etc.

In the dispersion, the silicon-supply source powder is preferably present in a solids content of 5 to 60% by weight, and the dispersing procedure is preferably carried out by using a disperse-agitator, for example, a wet type ball mill, a disperse-stirrer with rotating wings, such as a homomixer or blender, a paint shaker or a ultrasonic dispenser.

In the process of the present invention, when the silicon-supply source powder is dispersed in a dispersing medium, a polymeric compound soluble in the dispersing medium may be dissolved in the dispersion to promote the dispersion of the silicon-supply source powder in the dispersing medium and to prevent the precipitation of the powder. When the dispersing medium consists of an aqueous liquid, the polymeric compound is preferably selected from polyvinyl alcohol and methyl cellulose. Also, when the dispersing medium consists of tetrahydrofuran, the polymeric compound is preferably selected from polyvinyl butyral and polystyrene. When the shaped activated carbon fiber article is impregnated with a dispersion of the silicon-supply source powder in a dispersing medium containing the polymeric compound, and the dispersing medium is evaporated away, the polymeric compound serves as a binder for firmly fixing the particles of the silicon-supply source powder to the activated carbon fibers and prevents the removal of the powder from the shaped article. The polymeric compound is preferably contained in a content of 0.1 to 5% by weight in the dispersion of the silicon-supply source powder.

As mentioned above, after the shaped activated carbon fiber article is impregnated with the dispersion of the silicon-supply source powder in the dispersing medium, to uniformly distribute the particles of the silicon-supply source powder in the shaped article, the dispersing medium is removed by air-drying or heat-drying. The heat-drying is preferably carried out at a temperature equal to or higher than the boiling temperature of the dispersing medium. However, when the dispersing medium has a high vapor pressure, the removal of the dispersing medium may be carried out at a temperature lower than the boiling temperature of the dispersing medium. Usually, the removal of the dispersing medium is carried out by using a blast dryer at a temperature of 60 to 180° C. for one to several hours.

In the heating step of the process of the present invention, the mixture of the activated carbon fibers with the silicon-supply source powder is heated at a temperature of 1200 to 1500° C. in an atmosphere substantially free from substances reactive with carbon, silicon, silicon oxides and silicon carbide at 1200 to 1500° C. The heating procedure can be carried out in any conventional heating furnace. There is no limitation to the type of the heating furnace as far as the activated carbon fibers can be converted on-site to silicon carbide fibers in the inert gas atmosphere or under reduced pressure. The heating furnace can be selected from pipe-shaped furnaces, tunnel furnace, box-formed furnace, kiln, converter furnace, and fluidized bed furnace. The heating procedure can be carried out in a batch method, or continuously, in the inert gas atmosphere. In one embodiment of the process of the present invention, the heating procedure for the mixture is carried out while an inert gas flows through the mixture. The inert gas usable for the heating step of the process of the present invention consists essentially of at least one member selected from helium, neon and argon. In the inert gas, the total of partial pressures of oxygen and nitrogen is preferably limited to a level of $10^3$ Pa or less, more preferably $10^2$ Pa or less. The content of oxygen in the inert gas is preferably limited to a level of 0.001% by volume or less, and the content of nitrogen therein is preferably controlled to a level of 1% by volume or less.

When the inert gas flows through a layer of the mixture of the activated carbon fibers with the silicon-supply source powder placed in the heating furnace at a desired temperature, it is desirable that the inert gas can uniformly and fully flow through gaps left between the individual activated carbon fibers and the individual particles of the silicon-supply source powder. If the inert gas cannot fully flow through the gaps, a by-product gas generated by the reaction of the silicon and/or silicon oxide-containing gas generated from the silicon-supply source powder particles with the activated carbon fibers stays near the activated carbon fibers and hinders the progress of the reaction of the activated carbon fibers with the silicon and/or silicon oxide-containing gas. Namely, the flow of the inert gas blows away the by-product gas and promotes the desired reaction between the activated carbon fibers and the silicon and/or silicon oxide-containing gas.

To prevent an ineffective flow of the inert gas and to promote the desired reaction, it is preferable to prevent the flow of the inert gas through spaces other than the layer of the mixture of the activated carbon fibers with the silicon-supply source powder in the heating furnace. Also, it is preferable that the inert gas flows and passes through the heating furnace in a constant direction without staying in the furnace.

In practice, a furnace core tube of a reaction furnace is charged with the mixture of the activated carbon fibers with the silicon-supply source powder in such a manner that the inner space of the furnace core tube is completely filled by the mixture, and an inert gas is passed through the layer of the mixture filled in the furnace core tube, to attain the conversion of the activated carbon fibers to silicon carbide fibers. In this case, preferably the mixture filled in the furnace core tube has a free space volume of 60 to 99.9% by volume, more preferably 70 to 90% by volume. The free space volume of the filled mixture in the furnace core tube is calculated in accordance with the following equation (1):

$$\text{Free space volume}(\%) = [(B-A)/B] \times 100 \tag{1}$$

wherein A represents a total true volume of the mixture and B represents an inner space volume of the furnace center tube. The total true volume A of the mixture can be calculated from the specific gravities and weights of the activated carbon fibers and the silicon-supply source powder.

When the free space volume is less than 60% by volume, the inert gas may not fully flow through the free spaces of the mixture filled in the furnace center tube and thus, the by-product gas generated by the silicon carbide-producing reaction and covering the activated carbon fibers may not be fully removed and the conversion of the activated carbon fibers to silicon carbide fibers may be insufficient. Also, when the free space volume is more than 99.9% by volume, and the packing of the mixture in the furnace center tube may be too low, the production efficiency of the silicon carbide fibers may be too low and the silicon and/or silicon oxide-containing gas generated from the silicon-supply source powder may be excessively diluted by the inert gas and thus the reaction thereof with the activated carbon fibers may be insufficient.

The flow rate of the inert gas through the mixture is preferably in the range of from 1 to 100 liter/minute per kg of the total weight of the activated carbon fibers and the silicon-supply source powder. When the flow rate is less than 1 liter/min·kg, the by-product gas generated by the silicon carbide-producing reaction may not be removed and may be accumulated in the reaction system so as to obstruct the silicon carbide-producing reaction. Also, when the flow rate is more than 100 liter/min·kg, a portion of the silicon and/or silicon oxide-containing gas flows out from the reaction system without being employed for the silicon carbide-producing reaction, and thus the silicon carbide-producing reaction may be effected insufficiently.

The silicon carbide-producing reaction in the inert gas flow can be smoothly effected while the pressure in the furnace is in the range of from ambient atmospheric pressure to 1.2 times ambient atmospheric pressure, preferably 1.0 atmosphere, namely 1013.25 hPa. In practice, it is preferable that to prevent a penetration of the ambient air into the surface, a back pressure valve be arranged in the gas outlet of the furnace and the inner pressure of the furnace be maintained at a level slightly higher than the outside atmospheric pressure.

In another embodiment of the process of the present invention, the heating step at a temperature of 1200 to 1500° C. is carried out under a reduced pressure of $10^3$ Pa or less, preferably 1 to $10^3$ Pa. The reduced pressure atmosphere for the heating step is substantially free from substances, for example, oxygen, nitrogen, water and carbon dioxide, reactive with carbon, silicon, silicon oxides and silicon carbide at the temperature of 1200 to 1500° C.

The temperature-increasing rate of the mixture in the furnace is preferably controlled in the range of from 50 to 1500° C./hr. Also, in the heating step, the formation of whiskers can be prevented and the silicon carbide-producing reaction efficiency can be enhanced by ensuring that the temperature-increasing operation is stopped in a temperature range of from 700 to 1100° C., the reaction temperature is maintained at this level for a certain time, for example, 30 minutes to 5 hours, and then is increased to a desired final level between 1200 and 1500° C. In this case, the reaction atmosphere in the temperature range of 1100° C. or less preferably consists of nitrogen gas, having an oxygen content restricted to 0.001% by volume or less, as an inert gas.

The same effect as that obtained by maintaining the reaction temperature at the above-mentioned level for the above-mentioned time can be obtained by gradually increasing the reaction temperature, while it is in the range of from 700 to 1100° C., over a long time, in place of temperature-maintaining operation. When the temperature-maintaining operation is carried out at a temperature exceeding 1100° C., a disadvantageous formation of whiskers may occur. When the temperature-maintaining operation is carried out at a temperature lower than 700° C., no silicon and/or silicon oxide-containing gas is generated from the silicon-supply source powder, and thus no silicon carbide-producing reaction may occur.

The silicon carbide whiskers are thin fibrous crystalline substance consisting essentially of silicon carbide (SiC) and having a diameter of 0.5 to 1 μm and an aspect ratio of 20 to 100. Due to the small dimensions, the whiskers cannot be employed as are usual fibers.

In the process of the present invention, the production of the silicon carbide whiskers should be prevented to the utmost. For this purpose, before the start of the silicon carbide-producing reaction, preferably, volatile carbon-containing substances contained in the activated carbon fibers are completely removed by pre-heating. For this removal, the mixture of the activated carbon fibers with the silicon-supply source powder is preferably pre-heated before the silicon carbide-producing reaction occurs.

In the process of the present invention, the pre-heating time for the mixture before the silicon carbide-producing reaction can be shortened by using activated carbon fibers previously heat-treated at a temperature of 700° C. to 1100° C. Of course, the reaction system for the process of the present invention contains no whisker-producing catalyst.

In still another embodiment of the process of the present invention, a mixture of activated carbon fibers, pre-heated as mentioned above and substantially free from the volatile carbon-containing substances, with a silicon-supply source powder is heated to a temperature of from 1200 to 1500° C., preferably from 1200 to 1400° C., and maintained at this temperature for a desired time, for example, 1 to 5 hours. When the reaction temperature is less than 1200° C., the reaction of the activated carbon fibers with the silicon and/or silicon oxide-containing gas generated from the silicon-supply source powder does not fully proceed, and the resultant silicon carbide fibers exhibit unsatisfactory heat resistance and mechanical strength. Also, when the reaction temperature is higher than 1500° C., the silicon-supply source powder containing silicon and/or silicon oxides is agglomerated into lumps and thus the resultant silicon carbide fibers are difficult to separate from the agglomerated powder.

In the process of the present invention, the reaction time for which the reaction system is held at a temperature of 1200 to 1500° C. is variable in response to the reaction temperature. The higher the reaction temperature, the shorter the reaction time. When the reaction temperature is relatively low, the reaction time is relatively long. Usually, the reaction time is in the range of from 10 minutes to 10 hours, preferably 1 to 5 hours. When the reaction time is shorter than 10 minutes, the silicon carbide-producing reaction may not fully proceed. Also, if the reaction time is longer than 10 hours, not only is an excessive amount of energy fruitlessly consumed, but also the silicon carbide crystals in the silicon carbide fibers grow too much so as to affect on the mechanical strength of the fibers.

After the silicon carbide-producing reaction is fully completed, the resultant silicon carbide fiber-containing mixture is cooled to room temperature. There is no specific limitation to the cooling rate.

The silicon carbide fiber-containing mixture is taken out from the reaction furnace and the target silicon carbide fibers are separated and collected from the residual non-reacted silicon-supply source powder. The separation is advantageously effected by a conventional sieving procedure. The sieving procedure may be carried out in a wet method or a dry method. Preferably, the silicon carbide fiber-containing mixture is dispersed or macerated in water, and then the resultant dispersion is subjected to a wet sieving procedure. The sieve usable for the wet sieving procedure preferably has an opening size of 88 to 210 μm, more preferably 105 to 177 μm, as established for the standard sieve in accordance with Japanese Industrial Standard (JIS) Z 8801.

The silicon carbide fibers collected by the wet sieving procedure are dried and then are preferably further sieved through a sieve having a slightly larger opening size than as mentioned above, in a dry condition.

The sieve usable for the dry sieving procedure preferably has an opening size of 149 to 1000 μm as established for the standard sieve in accordance with JIS Z 8801. In this dry sieving procedure, a device for mechanically vibrating or shaking the sieve is advantageously utilized.

To separate the residual non-reacted silicon-supply source powder from the resultant silicon carbide fibers, a water-trough is advantageously utilized. In this water-trough method, the fibers and particles can be separated from each other due to difference in density and/or in fluid resistance between the fibers and the particles. The apparatus for the water-trough method can be selected conventional apparatuses disclosed, for example, in "Chemical Engineering Exercises", First Edition, published by Tokyo Kagakudojinsha, edited by Shigefumi Fujita, page 203.

Also, conventional precipitation-classification apparatuses (Chemical Engineering Handbook, Third Edition, published by Maruzen, edited by Chemical Engineering Association, page 882) utilizing a surface flow classification are usable for separating the silicon carbide fibers and the residual non-reacted powder used for the process of the present invention by the similar principle as mentioned above. Further, conventional dry or wet centrifugal separating apparatuses (Chemical Engineering Handbook, Third Edition, published by Maruzen, edited by Chemical Engineering Association, pages 885 to 897) can be used for the process of the present invention.

When the silicon carbide fibers separated from the residual non-reacted powder in a usual manner must be further strictly refined from the residual non-reacted powder, the refining procedure can be effected by applying at least one washing procedure with an aqueous solution of an alkali metal hydroxide and/or an aqueous solution containing, as a compound, hydrofluoric acid, to the collected silicon carbide fibers.

Namely, by applying a washing procedure with an aqueous solution of an alkali metal hydroxide such as sodium hydroxide or potassium hydroxide to the collected silicon carbide fibers, portions of residual silicon and silicon dioxide can be removed, and then by applying a washing procedure with an aqueous solution containing, as a component, hydrofluoric acid, the remaining silicon dioxide can be completely removed. In the washing procedures, the order of applying the alkali solution and the hydrofluoric acid solution may be reversed, or only one of the above-mentioned washing solutions may be used.

The aqueous alkali metal hydroxide solution preferably has a concentration of the alkali metal hydroxide of 10 to 25% by weight. The silicon carbide fibers are immersed and boiled in the aqueous alkali metal hydroxide solution to enhance the washing effect. As the aqueous solution containing, as a component, hydrofluoric acid, a commercially available aqueous solution having a hydrofluoric acid concentration of about 46% by weight per se may be employed. Also, the 46% aqueous hydrofluoric acid solution may be mixed with an approximately equivalent amount of a concentrated nitric acid solution containing 60 to 70% by weight of $HNO_3$ based on the total weight thereof, and the mixed acid may be used for the washing procedure.

The washing time for the silicon carbide fibers with the aqueous alkali metal hydroxide solution or the hydrofluoric acid-containing aqueous solution is about 1 to about 5 hours.

In accordance with the process of the present invention, silicon carbide fibers can be produced at a high efficiency under the ambient atmospheric pressure or a reduced pressure, without producing silicon carbide whiskers, by mixing a silicon-supply source powder containing silicon and/or silicon oxides with activated carbon fibers or a shaped article, for example, a sheet-shaped article or a three-dimensionally shaped article, made from the activated carbon fibers, and heating the mixture to cause a silicon and/or silicon oxide-containing gas to be generated from the silicon-supply source powder, and to be reacted with the activated carbon fibers.

EXAMPLES

The present invention will be further illustrated by the following examples which are merely representative and do not limit the scope of the present invention in any way.

In the examples and comparative examples, the opening size of the sieve is indicated in accordance with Japanese Industrial Standard Z 8801 for Standard Sieve.

Example 1

Activated carbon fibers (Renoves® A-10, made by Osaka Gas K.K.) produced from pitch and having a fiber length of 6 mm, a specific surface area of 1000 $m^2/g$ and a fiber thickness of 13 μm were dried in an air blast dryer at a temperature of 120° C. for 5 hours, and then fully mixed in an amount of 10 g with a silicon-supply source powder prepared by fully mixing 30 g of a silicon powder (first grade reagent, made by Wako Junyakukogyo K.K.) with 65 g of a silicon dioxide powder (first grade reagent, made by Wako Junyakukogyo K.K.) in a mortar. The resultant mixture was packed in a mullite furnace core tube, having an inner diameter of 45 mm, to a length of 150 mm.

In the silicon powder mentioned above, the fraction of particles passed through a sieve having an opening size of 149 μm was 100% by weight, and the fraction of particles passed through a sieve having an opening size of 44 μm was 45% by weight. Also, in the silicon dioxide powder mentioned above, the fraction of particles passed through a sieve having an opening size of 149 μm was 100% by weight, and the fraction of particles passed through a sieve having an opening size of 44 μm was 10% by weight.

The mixture of the activated carbon fibers with the silicon powder and the silicon dioxide powder, and packed in the furnace core tube, had a free space volume of 96% by volume. The furnace core tube is fixed in a tube-shaped furnace and heated, under ambient atmospheric pressure, from room temperature to a temperature of 900° C. over a time of 3 hours, maintained at this temperature for 3 hours, heated to a temperature of 1350° C. over a time of one hour and maintained at this temperature (1350° C.) for 4 hours, while an argon gas, having a degree of purity of 99.99% by volume flowed, at a flow rate of 250 ml/min. Then, the furnace core tube was cooled to room temperature over a time of 2 hours.

After cooling, the mixture of the resultant silicon carbide fibers with the residual powder containing non-reacted silicon and silicon dioxide powder was removed from the furnace core tube and dispersed in 10 liters of water by using an agitator (Agitare®, made by Shimazaki K.K.), to disperse the silicon carbide fibers. The silicon carbide fiber-containing aqueous dispersion was filtered through a sieve having an opening size of 149 μm. The remaining silicon carbide fibers on the sieve was rinsed with flowing water.

The rinsed silicon carbide fibers were collected and dried in an air blast dryer at a temperature of 105° C. The dried fibers were sieved through a sieve having an opening size of 600 μm to sieve and remove the residual powder cohered to the fibers.

The weight of the resultant silicon carbide fibers was measured. The weight was 14 g. As a result of an optical microscopic observation of the original activated carbon fibers and the resultant silicon carbide fibers, it was confirmed that substantially no difference in fiber length and fiber thickness was found between the original activated carbon fibers and the resultant silicon carbide fibers.

The silicon carbide fibers were heated in air at a temperature of 800° C. for 40 minutes. As a result, no reduction in weight was found, and no carbon was detected in the fibers. The dimensions and form of the fibers were measured before and after the heating procedure in air by a scanning electron microscope. As a result, no change in dimensions and form was found.

The silicon carbide fibers were pulverized into fine particles and subjected to an X-ray diffraction measurement. From the measurement result, it was confirmed that the fibers consisted of silicon carbide.

Comparative Example 1

Silicon carbide fibers were produced by the same procedures as in Example 1, except that in the heating step in the tube-shaped furnace, the heating temperature was increased from room temperature to 900° C. over a time of 3 hours, maintained at 900° C. for 3 hours, further increased to 1600° C. over a time of 1.5 hours and further maintained at 1600° C. for 3 hours, and then the resultant reaction mixture was cooled to room temperature.

After the cooling, the content in the furnace core tube was removed. It was found that the reaction mixture was luse-consolidated into a solid lump. It was attempted to macerate the resultant silicon carbide fibers by stirring the fuse-consolidated mixture in water. As a result, a portion of the mixture could be divided into the form of lumps. It was impossible to macerate and collect the resultant silicon carbide fibers.

Example 2

The same non-washed silicon carbide fibers as in Example 1 was immersed in an amount in 500 ml of an aqueous solution of 20% by weight of sodium hydroxide (NaOH) (first grade reagent, made by Wako Junyakukogyo K.K.), boiled for 30 minutes, rinsed with water and then dried. The dried fibers had a weight of 0.96 g and will be referred to as washed fibers (A) hereinafter.

The washed fibers (A) were immersed in an aqueous mixed acid solution of 250 ml of hydrofluoric acid (first grade reagent, made by Wako Junyakukogyo K.K.) with 250 ml of concentrated nitric acid (first grade reagent, made by Wako Junyakukogyo K.K.) at room temperature for one hour, rinsed with water, and then dried. The resultant dried fibers had a weight of 0.91 g and will be referred to as washed fibers (B).

The oxygen contents of the non-washed silicon carbide fibers and the washed fibers (A) and (B) were measured by an oxygen and nitrogen analyzer (trademark: Leco TC-436, made by Leco Co.). As a result, the oxygen contents were 5.5% by weight in the non-washed fibers, 5.2% by weight in the washed fibers (A), and 1.5% in the washed fibers (B). In a naked eye observation, whereas a small amount of residual particles was found on the non-washed fibers, the amount of the residual particles on the washed fibers (A) was very small, and no residual particles were found on the washed fibers (B).

Example 3

Activated carbon fibers (Renovese® A-10, made by Osaka Gas K.K.) produced from pitch and having a fiber length of 6 mm, a specific surface area of 1000 $m^2/g$ and a fiber thickness of 13 μm were dried in an air blast dryer at a temperature of 120° C. for 5 hours. The dried activated carbon fibers in an amount of 10 g were fully mixed with 100 g of a silicon monoxide powder which was prepared by pulverizing, under dry conditions, silicon monoxide grains (made by Sumitomo Stix K.K.) using a ball mill and comprises 100% by weight of a fraction of the pulverized particles passed through a sieve having an opening size of 149 μm and 0% by weight of a fraction of the pulverized particles passed through a sieve having an opening size of 44 μm. The resultant mixture was packed in a mullite furnace core tube having an inner diameter of 45 mm, into a length of 150 mm.

The mixture of the activated carbon fibers with the silicon monoxide powder packed in the furnace core tube had a free space volume of 96% by volume. The furnace core tube is fixed in a tube-shaped furnace and heated, under the ambient atmospheric pressure, from room temperature to a temperature of 900° C. over a time of 3 hours, maintained at 900° C. for 3 hours, heated to a temperature of 1350° C. over a time of one hour and maintained at this temperature (1350° C.) for 4 hours, while an argon gas having a degree of purity of 99.99% by volume flowed at a flow rate of 250 ml/min. Then, the inside of the furnace core tube was cooled to room temperature over a time of 2 hours.

After cooling, the mixture of the resultant silicon carbide fibers with the residual powder was removed from the furnace core tube and dispersed in 10 liters of water by using an agitator (Agitar®, made by Shimazaki K.K.), to disperse the resultant silicon carbide fibers. The silicon carbide fiber-containing aqueous dispersion was filtered through a sieve having an opening size of 149 μm. The silicon carbide fibers remaining on the sieve were rinsed with flowing water.

The rinsed silicon carbide fibers were collected and dried in an air blast dryer at a temperature of 105° C. The dried fibers were sieved through a sieve having an opening size of 600 μm to sieve and remove the residual powder cohered to the fibers.

The weight of the resultant silicon carbide fibers was measured. The weight was 15 g. As a result of an optical microscopic observation of the original activated carbon fibers and the resultant silicon carbide fibers, it was confirmed that substantially no difference in fiber length and fiber thickness was found between the original activated carbon fibers and the resultant silicon carbide fibers.

The silicon carbide fibers were heated in air at a temperature of 800° C. for 40 minutes. As a result, no reduction in weight was found, and no carbon was detected in the fibers. The dimensions and form of the fibers were measured before and after the heating procedure in air by a scanning electron microscope. As a result, no change in dimensions and form was found.

The silicon carbide fibers were pulverized into fine particles and subjected to an X-ray diffraction measurement with Cu-Kα rays. The resultant X-ray diffraction chart is shown in FIG. 1. From the chart, it was confirmed that the fibers exhibited large or small peaks at 35.6, 41.4, 60.6, 70.2 and 75.5 degrees, and thus consisted of β-type silicon carbide.

Example 4

A felt having a basis weight of 210 $g/m^2$ and comprising activated carbon fibers (Kuractive® FT-300-10, made by Kuraray Chemical K.K.) produced from a phenol resin and having a specific surface area of 1000 m²/g was cut into a piece having dimensions of 50 mm×50 mm, the resultant felt piece was dried in an air blast dryer at a temperature of 120° C. for 3 hours. The dry weight of the felt piece was 0.53 g. Separately, silicon monoxide grains (made by Sumitomo Stix K.K.) were pulverized by a ball mill under dry condition and sieved through a 325 mesh size sieve. A fraction of the pulverized silicon monoxide particles passed through the sieve was mixed in an amount of 10 g into an aqueous solution prepared by heat-dissolving 2 g of polyvinyl alcohol (first grade reagent, made by Wako Junyakukogyo K.K.) in 200 g of water and dispersed in the aqueous solution by an ultrasonic cleaning device for 5 minutes.

The activated carbon fiber felt piece was immersed in the aqueous silicon monoxide dispersion and subjected to a vibration treatment by the ultrasonic cleaning device for 15 seconds, to impregnate the felt piece with the dispersion.

The impregnated felt piece was removed from the dispersion and interposed between filter paper sheets to remove an excessive amount of the dispersion from the felt piece.

The felt piece impregnated with the silicon monoxide dispersion was dried in an air blast dryer at a temperature of 120° C. for 3 hours. The dried piece had a weight of 1.5 g.

The felt piece was packed in an alumina furnace core tube having an inner diameter of 60 mm placed in a tube-shaped furnace. While an argon gas (having a degree of purity of 99.99% by weight) flowed through the furnace core tube at a flow rate of 250 ml/min., the inside temperature of the furnace core tube was increased, under the ambient atmospheric pressure, from room temperature to 900° C. over a time of 3 hours, maintained at 900° C. for 3 hours, raised to 1350° C. over a time of one hour, and maintained at 1350° C. for 4 hours, to convert the activated carbon fibers to silicon carbide fibers.

Then, the furnace core tube was cooled to room temperature over a time of 2 hours. The resultant felt piece had a weight of 0.88 g.

The felt piece was heated in air at a temperature of 80° C. for 40 minutes. No reduction in weight of the felt piece was found.

A portion of the felt piece was pulverized and subjected to an X-ray diffraction analysis. As a result, it was confirmed that the resultant felt piece consisted of silicon carbide.

Example 5

The same active activated carbon fibers as in Example 1 produced from pitch and having a fiber length of 6 mm, a specific surface are of 1000 m²/g and a fiber thickness of 13 μm were dried in an air blast dryer at a temperature of 120° C. for 5 hours. The dried activated carbon fibers in an amount of 30 g were fully mixed with 55 g of a silicon powder (first grade reagent, made by Wako Junyakukogyo K.K.) and 120 g of a silicon dioxide powder (first grade reagent, made by Wako Junyakukogyo K.K.) in a stirring mixer (trademark: Kenmix, made by Aikosha K.K.) for 3 minutes under dry condition.

The mixture in an amount of 30 g was admixed with 30 g of an aqueous solution of 2% by weight of polyvinyl alcohol (Kuraraypoval® 124, made by Kuraray K.K.), and the admixture was stirred for 3 minutes.

The resultant admixture was in the form of grains having a grain size of 2 to 10 mm and dried at a temperature of 120° C. for 3 hours. The drying procedure caused no change in form of the admixture grains, and no separation of the silicon and silicon dioxide particles from the activated carbon fibers. However, it was found that the dried admixture grains were porous.

The dried admixture grains were packed in an alumina furnace core tube having an inner diameter of 70 mm and placed in a tube-shaped electric furnace. The packed admixture grain layer in the furnace core tube had a free space volume of 85% by volume.

While a nitrogen gas having a degree of purity of 99.99% by volume flowed through the admixture grain layer in the furnace core tube at a flow rate of 2.0 liters/min., the inside temperature of the furnace core tube was increased, under the ambient atmospheric pressure, from room temperature to 500° C. over a time of 5 hours, and then to 900° C. over a time of 2 hours, and maintained at 900° C. for 3 hours. Then, while an argon gas, having a degree of purity of 99.99% by volume in place of the nitrogen gas, flowed through the packed admixture grain layer at a flow rate of 1.0 liter/min., the inside temperature of the furnace core tube was increased to 1380° C. over a time of 1.5 hours and then maintained at 1380° C. for 4 hours, to convert the activated carbon fibers to silicon carbide fibers. Thereafter, the resultant admixture was gradually cooled to room temperature over a time of 6 hours.

The resultant reaction product was removed from the furnace core tube, immersed in 10 liters of water and stirred by a stirrer (trademark: Agitar, made by Shimazaki K.K.) to disperse the resultant silicon carbide fibers from the residual silicon and silicon dioxide particles and to provide an aqueous slurry containing the fibers and particles.

Separately, a precipitate-separating apparatus comprising a cylinder having an inner diameter of 50 mm and a length of 600 mm and provided with a top opening for delivering fibers therethrough, a closed bottom, an inlet for feeding water located 30 mm above the bottom, and an inlet for feeding a slurry located 300 mm above the bottom, was prepared.

In the precipitate-separation apparatus, while water was introduced through the water-feeding inlet at a flow rate of 0.5 liter/min., the above-mentioned slurry was fed through the slurry-feeding inlet at a flow rate of 0.5 liter/min., so as to allow the silicon carbide fibers to be delivered through the top opening of the cylinder by the overflow of water, and the residual silicon and silicon dioxide particles to fall to the bottom of the cylinder. The delivered fibers were collected and dried in an air blast dryer at a temperature of 120° C. The dried fibers were obtained in an amount of 32 g. The dried fibers contained no residual particles. When the dried fibers were heated in air at a temperature of 800° C. for 40 minutes, no reduction in weight was found. The dried fibers were pulverized and subjected to the x-ray diffraction analysis. As a result, it was confirmed that the dried fibers consisted of silicon carbide.

Example 6

Activated carbon fibers (Renoves® A-10, made by Osaka Gas K.K.) produced from pitch and having a fiber length of 6 mm, a specific surface area of 1000 m²/g and a fiber thickness of 13 μm were dried in an air blast dryer at a temperature of 120° C. for 5 hours. The dried activated carbon fibers in an amount of 50 g were dispersed together with a silicon-supply source powder comprising 100 g of a silicon powder (first grade reagent, made by Wako Junyakukogyo K.K.) with 150 g of a silicon dioxide powder (first grade reagent, made by Wako Junyakukogyo K.K.) in 10 liter of water.

The dispersion was further added with a binder comprising 2 g of a polyvinyl acetate resin emulsion, 50 g of an aqueous solution of 2% by weight of polyvinyl alcohol (Kuraraypoval® 124, made by Kuraray K.K.) and 2 g of starch, and the mixed dispersion was stirred by rotating stirring wings by a motor (Haydon Three One Motor, made by Shinto Kagaku K.K.) at 500 rpm for 10 minutes.

The mixed dispersion was subjected to a centrifugal hydroextraction using a centrifugal hydroextractor (model: H-120B, made by Kokusan K.K.) at 2000 rpm for 3 minutes. The resultant mixture in the form of a mat was pulverized into pellets having a size of 5 to 30 mm and then dried at a temperature of 120° C. for 3 hours. The drying procedure caused no change in the form and dimensions of the pellets, and no elimination of the powder from the pellets. The dried pellets in an amount of 280 g were packed in an alumina furnace core tube having an inner diameter of 70 mm in a tube-shaped electric furnace. The packed pellet layer in the core tube had a free space volume of 80% by volume.

While evacuating the furnace core tube at an evacuation rate of 50 liters/min. by using a hydraulically driven vacuum pump, the temperature in the furnace core tube was increased from room temperature to 900° C. over a time of 5 hours, held at this temperature for 3 hours, increased from 900° C. to 1360° C. over a time of 1.5 hours, held at 1360° C. for 4 hours, and then cooled to room temperature over a time of 6 hours. During the period from the start of the temperature increase to the end of the cooling, the evacuation procedure by the vacuum pump was continued.

In the period between a stage at which the temperature of the core tube reached 1200° C. and a stage of one hour after the state of the temperature-holding operation at 1360° C., the pressure of the furnace core tube was 13 to 200 Pa.

After the completion of the heating step, the reaction product mixture was removed from the furnace core tube, immersed and stirred in 10 liter of water by using a stirrer (trademark: Agiter, made by Shimazaki), to separate the resultant silicon carbide fibers from the residual non-reacted powder. The resultant slurry, containing the fibers and the powder separated from each other, was filtered through a sieve having an opening size of 149 μm. The fibers left on the sieve were rinsed with water.

The rinsed fibers were collected, dried in an air blast dryer at a temperature of 105° C., and sieved using a sieve having an opening size of 600 μm to remove the residual powder from the fibers left on the sieve.

The resultant fibers was in a weight of 70 g. As a result of an optical microscopic observation, substantially no change in the fiber length and the fiber thickness was found between before and after the activated carbon fiber-to-silicon carbide fiber conversion reaction.

When a sample of the resultant fibers were pulverized and subjected to an X-ray diffraction analysis, it was confirmed that the resultant fibers consisted of silicon carbide.

In the process of the present invention, activated carbon fibers, which may be in the form of a shaped article, for example, a sheet-shaped article or a three dimensionally-shaped article, can be reacted with a silicon oxide-containing gas generated from a silicon or silicon oxide-containing powder located around the individual fibers, to convert the activated carbon fibers to silicon carbide fibers with a high efficiency.

We claim:

1. A process for producing silicon carbide fibers, comprising the steps of:

mixing a silicon-supply source powder comprising a mixture of silicon powder and silicon dioxide powder having a molar mixing ratio of 1:0.1 to 1:2 with activated carbon staple fibers having a length of 0.1 to 50 mm and a fiber thickness of 1 to 20 μm and a specific surface area of 300 to 2000 m$^2$/g determined by the BET nitrogen absorption method; and heating the resultant mixture at a temperature of 1200 to 1500° C. to directly convert the activated carbon staple fibers, in an atmosphere substantially free from substances reactive with carbon, silicon, silicon oxides and silicon carbide at the above-mentioned temperature, to silicon carbide fibers.

2. The process as claimed in claim 1 wherein the atmosphere for the heating step has a total partial pressure of oxygen and nitrogen restricted to 10$^3$ Pa or less.

3. The process as claimed in claim 1 wherein the heating step is carried out by passing an inert gas through the mixture.

4. The process as claimed in claim 3 wherein the inert gas consists of at least one member selected from the group consisting of argon, helium and neon.

5. The process as claimed in claim 3 wherein the inert gas flow is under ambient atmospheric pressure.

6. The process as claimed in claim 1 wherein the atmosphere for the heating step is under a reduced pressure of 10$^3$ Pa or less.

7. The process as claimed in claim 6 wherein the reduced pressure for the heating step is in the range of from 1 to 10$^3$ Pa.

8. The process as claimed in claim 1 wherein, in the mixing step, the silicon supply source powder is present in an amount of 1.2 to 20.0 times the dry weight of the activated carbon staple fibers.

9. The process as claimed in claim 1 wherein the silicon-supply source powder contains a fraction consisting of particles having a particle size of 149 μm or less in an amount of 90% by weight or more, and a fraction consisting of particles having a particle size of 44 μm or less in an amount of 60% by weight or less, based on the total weight of the silicon-supply source powder.

10. The process as claimed in claim 1 wherein the mixing step of the activated carbon fibers with the silicon supply source powder is carried out in the presence of at least one member selected from volatile mediums, and solutions and dispersions of binders in volatile mediums.

11. The process as claimed in claim 10 wherein the volatile mediums are selected from water, lower alkyl alcohols, lower alkyl ketones and toluene.

12. The process as claimed in claim 10 wherein the binder is selected from polyvinyl alcohols, methyl cellulose, polyvinyl butyral, starch, pulps and microfibrile cellulose, and is present in an amount of 0.01 to 0.10 kg per kg of the activated carbon fibers.

13. The process as claimed in claim 1 wherein the activated carbon fibers are in the form of a sheet or a three-dimensionally shaped article.

14. The process as claimed in claim 13 wherein the sheet is selected from woven, knitted and nonwoven fabrics, felts and composites of two or more of the fabrics and felts.

15. The process as claimed in claim 13 wherein the sheet or three-dimensionally shaped activated carbon fiber article is mixed with the silicon-supply source powder by impregnating the article with a dispersion of the powder in an volatile medium and then evaporating the volatile medium.

16. The process as claimed in claim 15 wherein the dispersion of the silicon-supply source powder in the volatile medium further comprises a polymeric binder.

17. The process as claimed in claim 1 wherein, after the mixing step, the resultant mixture of the activated carbon staple fibers and the silicon-supply source powder is filled in a heating zone, wherein the mixture filled heating zone has a free space volume of 60 to 99.9% and in the heating step, inert gas is passed through the free spaces in the mixture.

18. The process as claimed in claim 1 wherein, after the heating step is completed, the residual non-reacted silicon supply source powder is separated and removed from the resultant silicon carbide fibers.

19. The process as claimed in claim 18 wherein the residual non-reacted silicon-supply source powder is removed by at least one washing procedure with a washing solution selected from aqueous solutions of alkali metal hydroxides and an aqueous solution of hydrofluoric acid.

20. The process as claimed in claim 1, wherein the resultant mixture is free from whisker forming catalysts.

21. The process as claimed in claim 1, wherein the resulting silicon carbide fibers have dimensions which are substantially the same as those of the unreacted activated carbon staple fibers.

* * * * *